United States Patent
Marraud

(10) Patent No.: US 8,995,751 B2
(45) Date of Patent: Mar. 31, 2015

(54) METHOD FOR VIRTUALLY EXPANDING AND ENRICHING THE FIELD OF VIEW OF A SCENE

(75) Inventor: Denis Marraud, Issy les Moulineaux (FR)

(73) Assignee: European Aeronautic Defence and Space Company-EADS France, Paris (FR)

(*) Notice: Subject to any disclaimer, the term of this patent is extended or adjusted under 35 U.S.C. 154(b) by 0 days.

(21) Appl. No.: 13/262,668

(22) PCT Filed: Apr. 2, 2010

(86) PCT No.: PCT/EP2010/054462
§ 371 (c)(1),
(2), (4) Date: Nov. 16, 2011

(87) PCT Pub. No.: WO2010/112604
PCT Pub. Date: Oct. 7, 2010

(65) Prior Publication Data
US 2012/0051627 A1    Mar. 1, 2012

(30) Foreign Application Priority Data
Apr. 3, 2009   (FR) ................................. 09 52197

(51) Int. Cl.
G06K 9/36   (2006.01)
G06T 3/40   (2006.01)

(52) U.S. Cl.
CPC .................................. *G06T 3/4038* (2013.01)
USPC ........................................................ 382/154

(58) Field of Classification Search
CPC ......................................................... G06K 9/36
USPC ........................................................ 382/154
See application file for complete search history.

(56) References Cited

U.S. PATENT DOCUMENTS

| | | | |
|---|---|---|---|
| 5,953,054 A * | 9/1999 | Mercier | 348/50 |
| 2003/0133020 A1* | 7/2003 | Suh | 348/218.1 |
| 2007/0242900 A1* | 10/2007 | Chen et al. | 382/294 |
| 2008/0199043 A1* | 8/2008 | Forsgren | 382/103 |
| 2009/0022369 A1* | 1/2009 | Satoh et al. | 382/106 |
| 2009/0232354 A1* | 9/2009 | Camp et al. | 382/103 |

OTHER PUBLICATIONS

Video Mosaics for Virtual Environments. Szeliski, R. IEEE Computer Graphics and Applications, IEEE Service Center. Mar. 1, 1996, pp. 22-30.*
Google Earth User Guide. 2007. pp. 1-13.*
Szeliski R; "Video mosaics for virtual environments", IEEE Computer Graphics and Applications, Mar. 1, 1996, ISSN: 0272-1716, pp. 22-30.

(Continued)

*Primary Examiner* — Stephen R Koziol
*Assistant Examiner* — Delomia Gilliard
(74) *Attorney, Agent, or Firm* — Pearne & Gordon LLP

(57) ABSTRACT

The invention relates to a method for virtually expanding and enriching the field of view of the current image of a scene described by a video including several images.
This method includes the following steps of:
  a—expanding said field of view by at least one mosaic obtained from said images and by inserting at least one contextual datum in the reference frame of the current image of said scene,
  b—enriching said field of view by at least one piece of information referenced in said contextual datum.

15 Claims, 2 Drawing Sheets

(56) References Cited

OTHER PUBLICATIONS

Google Earth User Guide, Internet Citation Jan. 1, 2007, pp. 1-131, XP007910480 URL:http//www.docstoc.com/docs/4625050/Google-Earth-User-Guide>.

Yamauchi et al; "Non-optical Expansion of Field-of-view of the Rigid Endoscope", National Institute of Advanced Industrial Science and Technology (AIST), IFMBE Proceedings, vol. 14/6, JC 29 pp. 4184-4186, 2006.

Honda et al; "Psuedo Expansion of Field-of-View for Immersive projection Displays" p. 1, SIGGRAPH, 2007.

International Search Report for PCT/EP2010/054462 dated Jul. 14, 2010.

* cited by examiner

METHOD FOR VIRTUALLY EXPANDING AND ENRICHING THE FIELD OF VIEW OF A SCENE

TECHNICAL FIELD

This invention is in the field of image processing and relates to the observation of a scene from a still image or a video.

More specifically, the invention relates to a method for virtually expanding and enriching the field of view of the current image of a scene described by a video including several images in order to extract relevant information therefrom.

STATE OF PRIOR ART

The solutions used in prior art for expanding and enriching the field of view of a scene generally consist in exploiting location metadata of the image source to project the range of the field of view of said source or the image itself on a geographical reference (map, ortho-image, 3D model, . . .). This enables the current image provided by the image source to be located on a particular area to be observed.

Thus, in the case of video surveillance type applications or earth station of drones, known solutions consist in exploiting the location metadata of aerial cameras.

One drawback of this solution arises from the fact that the operator must look at two information sources (the image and the geographical reference) which, under conditions of stress (military operations, terrorist attacks . . .) prejudices the effectiveness and responsiveness.

Besides, the auxiliary data are generally not sufficiently accurate to enable the image to be accurately located on the geographical reference. Finally, depending on the image acquisition conditions, and despite the viewing of the footprint, it can be tedious to designate matching points (buildings, streets, . . .) between the image and the reference.

To overcome this drawback, some systems, in particular in video surveillance, provide projecting the fields of view of each camera in a 3D view of the scene. Then, the operator gains access to the camera views by navigating in the real time enriched 3D model. This solution solve the problem of the location perception of each camera but is subjected to potential problems of 3D object distortions after reprojection and further has the drawback of displaying a transformed image to the operator (according to the point of view) which, from the operator's point of view, is generally very badly felt (need to gain access at any time at the as less transformed as possible raw information from the sensor).

The issues of the expansion of the field of view of a scene have already been provided by Honda et al (Pseudo Expansion of Field of View for Immersive Projection Displays—K. Honda, N. Hashimoto, M. Sato—SIGGRAPH'07) as well as Magjarevic et al (Non-Optical Expansion of Field of View of the Rigid Endoscope—R. Magjarevic et al, World Congress on Medical Physics and Biomedical Engineering 2006). However, the techniques described in these documents use only the recent images of the video (N latest images) in a real time mosaicking approach and therefore only operate in movements for bringing elements closer together for which the current image is always fully included in the previous image.

The object of the invention is to overcome the drawbacks of prior art described above.

DESCRIPTION OF THE INVENTION

This object is achieved by a method wherein mosaicking potentially uses the entire available video and the missing information can be updated from contextual information such as an image with a greater field available on the area, an aerial image, a 3D model retimed with the right point of view, a map, . . . .

This is achieved by a method for virtually expanding and enriching the field of view of the current image of a scene described by a video comprising several images including:

a—expanding said field of view by at least one mosaic obtained from said images and by inserting at least one contextual datum in the reference frame of the current image of said scene, b—enriching the field of view by at least one piece of information referenced in said contextual datum, which method is characterised in that it further includes steps of:

c—inserting auxiliary location data in the current image, d—completing the field of view of the current image of said scene by mosaic portions stored beforehand and comprised in the field of view expanded by step a).

In a first alternative embodiment, step a) is obtained by real time multi-resolution mosaicking said video in a fixed reference frame.

Said stored beforehand mosaic includes a fixed pre-set number of resolution levels.

In another alternative embodiment, step a) is obtained by delayed time multi-resolution mosaicking on all images of said video.

In this case, the number of resolution levels of the mosaic is assessed from characteristics of said video.

The method according to the invention further includes a contextual referencing of the current image of said scene by either direct retiming between said current image and said contextual data, or retiming the available mosaic with said contextual data.

The auxiliary location data inserted in the current image are for example an aerial image of the area where said scene occurs, a textured or untextured 3D model of the area where said scene occurs, images of said scene taken at different points of view, or a geographical map type contextual datum.

Thanks to the method according to the invention, the interpretation of the current image is thus made easier by its inclusion in its more global context and by its semantic enrichment.

BRIEF DESCRIPTION OF THE DRAWINGS

Further characteristics and advantages will become clearer in the following description, taken as a non-limiting example, in reference to the appended figures wherein.

DETAILED DESCRIPTION OF PARTICULAR EMBODIMENTS

The method according to the invention relates to the context of the use of images or videos for observing or monitoring an expanding scene. Applications are numerous: area monitoring from a fixed or moving camera, placed on the ground or on board any flying vehicle (drones, dirigible, airplane, helicopter, etc. . . .), navigation in a video surveillance camera network, sports broadcast (Tour de France, Formula 1, horse racings, etc. . . .)

These applications have the common feature observation at a given time of a small part of the scene to be observed. Indeed, a trade off is necessary between the dimensions of objects which can be observed (resolution) and the observation covering (field of view). This trade off reflects in the focal length used: a high focal length ("zoom") corresponds to a fine resolution of the observed scene but offers a reduced field of view which harms the global perception of the scene and in particular the location of the scene observed within said area. On the contrary, a low focal length ("wide angle") allows a good perception of the entire scene but does not allow a fine observation of objects, vehicles, people, being present on the field.

The method provided enables a scene to be observed with a maximum resolution (high focal length) while preserving a good perception of the location of the scene observed within the entire area of interest. For example, the global area of interest can be, depending on the application, a fighting area observed by a drone, a town observed by a video surveillance camera network, the route of a stage of the Tour de France. The area observed at any time by video is then respectively centred on a carriage moving in the fighting area, one of the views of the video surveillance cameras, a view centred on the bunch (cycle race). In all three cases, to be able to view the close views in their global context (global area of interest) would provide particularly relevant information for interpreting the observed scene (what does the carriage move closer to? In which direction is the car observed by the camera X heading for? Where is the bunch relative to the finish, etc. . . .).

The aim of the mechanism for virtually expanding the field of view is to give the possibility to the operator to virtually decrease the focal length of its objective ("virtual unzoom") in order to be able to better locate the current observed area relative to the global area of interest. In practice, the unzooming reflects in the overlay of the current field of view in an image of a greater field the pixels off the current field of view of which come from available contextual information.

Figure 1:
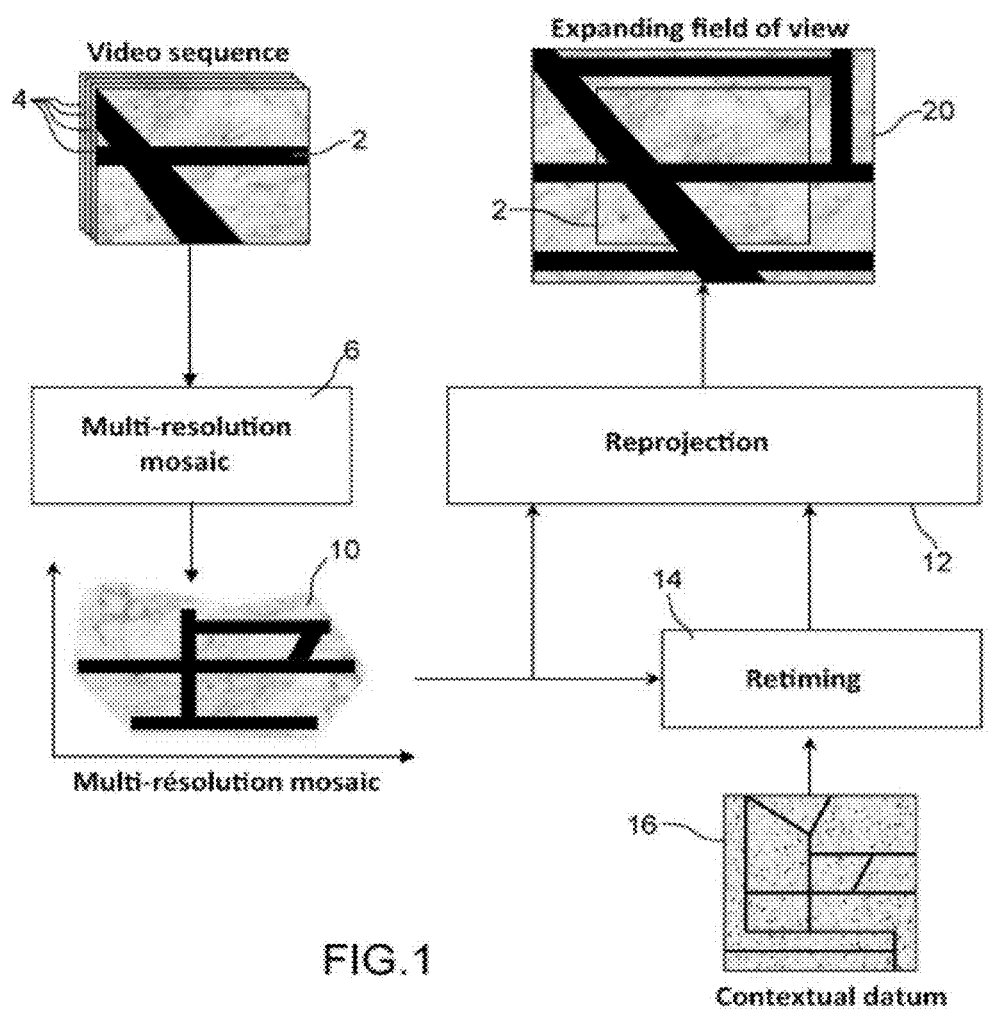
FIG. 1 schematically illustrates the expansion of a field of view of a video scene by the combination use of a multi-resolution mosaic and contextual data according to the invention, FIG. 2 schematically illustrates the enrichment of the field of view of this scene of FIG. 1 by transmission of semantic information referenced in the contextual data.

FIG. 1 illustrates the mechanism for virtually expanding the field of view of an area 2 in a video scene comprised of several images 4.

Step 6 consists in generating, from said video, a multi-resolution mosaic 10.

The mosaicking is multi-resolution in that it is constructed as a tile pyramid corresponding to different resolution levels and allowing to take great variations in the ground resolution of the video into account.

Thus, a video having a continuous zoom on an area (switching from long shot to close-up) results in a mosaic made up of tiles that are more and more resolved and more and more located within the initial low resolution tile.

The real field of view of the area 2 is then completed, partly by reprojection (step 14) of the mosaic made at step 6, partly by retiming (step 14) and reprojection of one or more contextual data 16 in the reference frame of the current image.

In the case of FIG. 1, the contextual datum is a map of the area to be observed. Nevertheless, this can be a textured or untextured 3D model, other images taken at different points of view or an aerial image of said area.

After reprojection, an expanding field of view 20 is obtained, including a current image of the area 2 replaced in the context reconstituted from the mosaic 6 and including the contextual data 16.

In a first embodiment, the multi-resolution mosaicking is performed in real time, in a fixed reference frame (typically a geographical reference frame, a reference frame of the first image, etc. . . .), and then the mosaic portions comprised in the expanding field of view are used to complete the current field of view.

Using a fixed reference frame for calculating the mosaic enables recalculating the entire mosaic at each image to be avoided, which would induce a useless calculation load and a fast degradation in the image quality.

Besides, using a stored mosaic enables the expansion possibilities of the field of view to be expanded with respect to a mosaicking limited to the latest images of the video.

In a second embodiment, the multi-resolution mosaicking is performed in a delayed mode on the entire video, and then the complete multi-resolution mosaic is used at each delayed viewing of the video.

As compared to real time, expansion capabilities of the field of view from the video data are thus potentially increased since the method then relies not only on past images but also on future ones.

In real time mode, the number of resolution levels of the mosaic is fixed and pre-set in the algorithm.

On the other hand, in delayed mode, the number of resolution levels can be assessed from characteristics of the video such as, for example, the variation in the ground resolution on the entire video to mosaic.

In the case where a single resolution level is imposed, mosaicking can be made in the resolution of the chosen reference frame (geographical reference frame, first image, etc. . . .).

The multi-resolution mosaicking is completed in both real time and delayed time modes by a contextual referencing of the current image. This referencing either uses a direct retiming between the current image and contextual data (aerial image, image from another point of view, map, 3D model, etc. . . .), or is performed via the retiming of the mosaic available (real time mosaic in a real time mode or complete mosaic in a delayed mode) with contextual data.

In both cases, the referencing can make use of possible auxiliary location data available (case of an observation drone for example).

The pairing between the current data and the contextual data is used:
a) to reproject contextual data in the expanding field of view, thus allowing a better interpretability of the image,
b) depending on the type of reference data enabling to assess the capturing conditions of the current datum (typically position and 3D orientation). In the case of the use of 3D reference data, assessed capturing conditions are used to reproject the 3D model optimally.

The point of having a "virtual unzoom" with respect to a "real unzoom" is multiple: on the one hand, "unzoom" is potentially limited: the limit is only given by the extents of the available contextual data. On the other hand, in a real time frame, the real unzoom has the risk of losing sight of the object of interest in particular if it is tracked by an automatically tracking algorithm. Finally, in delayed mode (investigation, editing, . . .), the operator has no longer the ability to affect the capturing parameters and thus to perform a real unzoom.

Figure 2:
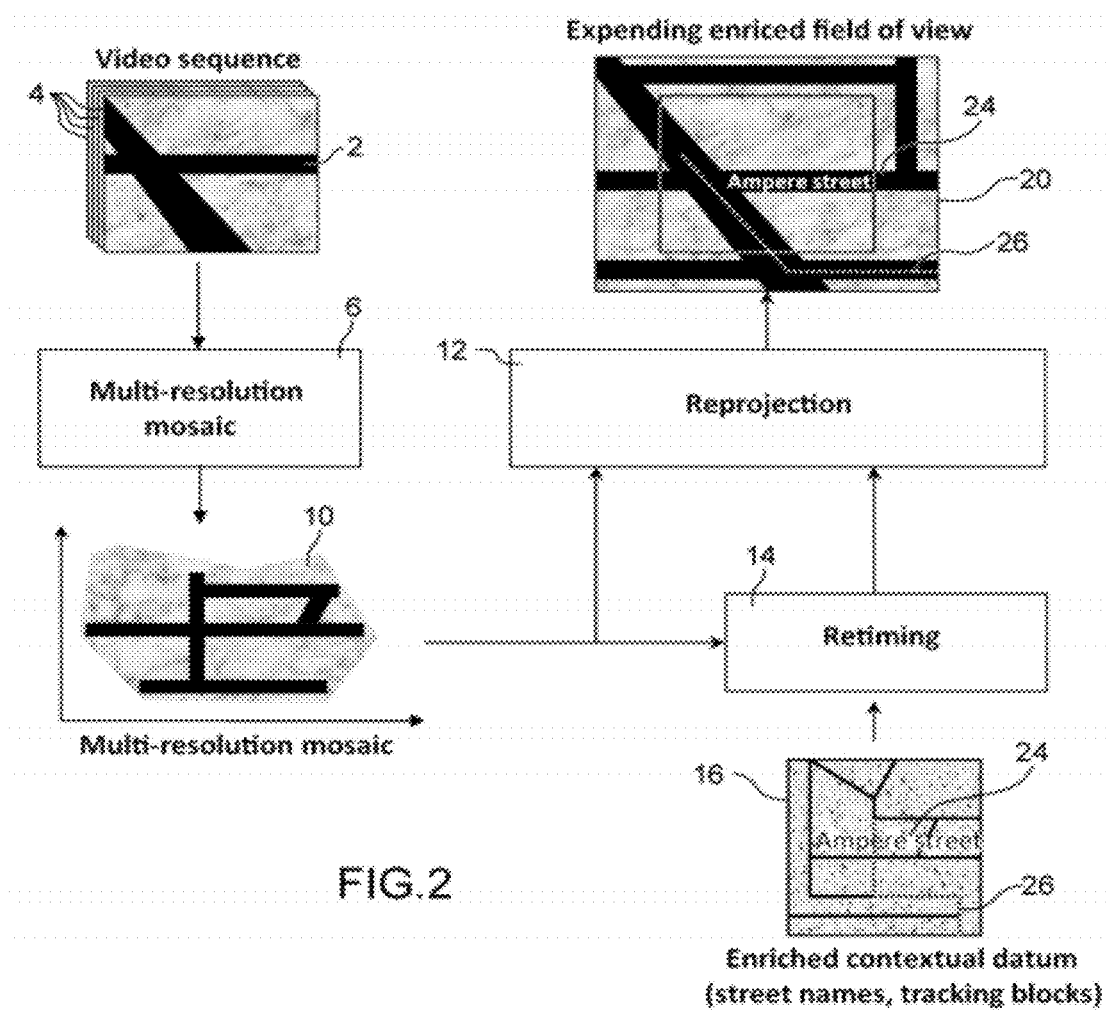

FIG. 2 illustrates the mechanism of enriching the field of view of the area 2 to increase the intelligibleness of the scene.

Besides the steps previously described with reference to FIG. 1, this mechanism includes a further step of enriching the contextual datum 16 with a semantic or asemantic piece of information such as the street name 24 or tracking blocks 26.

This mechanism also allows, thanks to the permanent retiming 14 of the current image with the contextual data, at the request of the operator, said semantic or asemantic information about the content of the scene directly in the observed image (and if need be in the expanding field) to be transmetted in an "increased reality" type approach.

Such an approach contributes to synthetizing the available information on a given scene within one and single viewing, dramatically increases the intelligibleness of the observed scene and finally improves the operator's effectiveness.

In the case of a drone performing air surveillance above an urban area for example, the semantic information directly displayable in the image is for example:
- a building of interest,
- the street names,
- a movable target tracked by another means,
- etc. . . .

The asemantic information can typically result from the processing of the current image for detecting changes with respect to the real time mosaic and/or with respect to the reference data. Such a change detection enables the operator's attention to be called to an object present in the current image and absent from the previous observation for example.

The method according to the invention is applicable in the case where an expanding scene is observed by one or more sensors. For example, let us quote:
- Ground station of reconnaissance drone: the virtual expansion and the enrichment of the field of view are particularly relevant within the scope of urban surveillance where the ground resolution requirements impose a reduced field of view and thus a difficulty for the operator to accurately locate the current image relative to its surveillance area (district, town, etc. . . .),
- Situation report from a video surveillance network:

the functionalities provided by the method according to the invention enable to facilitate the multi-camera tracking of an object of interest, or the global location of an observed object.

The invention claimed is:

1. A method for virtually expanding and enriching the field of view of the current image of a scene described by a video comprising several images including:
    a—expanding said field of view by at least one mosaic obtained from said images and by inserting at least one contextual datum in the reference frame of the current image of said scene, wherein the at least one contextual datum is from, or derived from, a source other than said video comprising several images,
    b—enriching said field of view by at least one piece of information referenced in said contextual datum,
    c—inserting auxiliary location data in the current image, and
    d—completing the field of view of the current image of said scene by mosaic portions stored beforehand and comprised in the field of view expanded by step a), wherein completing the field of view is achieved by partly reprojecting the mosaic obtained from said images, by partly retiming, and by reprojecting one or more contextual data in the reference frame of the current image,
    wherein expanding said field of view is obtained by real multi-resolution mosaicking of said video in a fixed reference frame and the number of resolution levels of the mosaic is assessed from characteristics of said video.

2. The method according to claim 1, wherein said mosaic stored beforehand includes a fixed pre-set number of resolution levels.

3. The method according to claim 1, further including a contextual referencing of the current image of said scene by either direct retiming between said current image and said contextual data, or retiming the mosaic available with said contextual data.

4. The method according to claim 1, wherein said contextual datum is an aerial image of the area where said scene occurs.

5. The method according to claim 1, wherein said contextual datum is a textured or untextured 3D model of the area where said scene occurs.

6. The method according to claim 1, wherein said contextual datum is made up of images of said scene taken at different points of view.

7. The method according to claim 1, wherein said contextual datum is a geographical map.

8. A method for virtually expanding and enriching the field of view of the current image of a scene described by a video comprising several images including:
    a—expanding said field of view by at least one mosaic obtained from said images and by inserting at least one contextual datum in the reference frame of the current image of said scene, wherein the at least one contextual datum is from, or derived from, a source other than said video comprising several images,
    b—enriching said field of view by at least one piece of information referenced in said contextual datum,
    c—inserting auxiliary location data in the current image, and
    d—completing the field of view of the current image of said scene by mosaic portions stored beforehand and comprised in the field of view expanded by step a), wherein completing the field of view is achieved by partly reprojecting the mosaic obtained from said images, by partly retiming, and by reprojecting one or more contextual data in the reference frame of the current image,
    wherein expanding said field of view is obtained by a delayed time multi-resolution mosaicking of all images of said video.

9. The method according to claim 8, wherein said mosaic stored beforehand includes a fixed pre-set number of resolution levels.

10. The method according to claim 9, wherein the number of resolution levels of the mosaic is assessed from characteristics of said video.

11. The method according to claim 8, further including a contextual referencing of the current image of said scene by either direct retiming between said current image and said contextual data, or retiming the mosaic available with said contextual data.

12. The method according to claim 8, wherein said contextual datum is an aerial image of the area where said scene occurs.

13. The method according to claim 8, wherein said contextual datum is a textured or untextured 3D model of the area where said scene occurs.

14. method according to claim 8, wherein said contextual datum is made up of images of said scene taken at different points of view.

15. The method according to claim 8, wherein said contextual datum is a geographical map.

* * * * *